US010838289B2

(12) United States Patent
Tanaka et al.

(10) Patent No.: US 10,838,289 B2
(45) Date of Patent: Nov. 17, 2020

(54) LIGHT SOURCE DEVICE AND PROJECTION DISPLAY APPARATUS INCLUDING PLURAL LIGHT SOURCES, AND A LENS CONDENSING LIGHT FROM THE PLURAL LIGHT SOURCES INTO ONE SPOT

(71) Applicant: Panasonic Intellectual Property Management Co., Ltd., Osaka (JP)

(72) Inventors: Takaaki Tanaka, Osaka (JP); Manabu Okuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/615,444

(22) Filed: Jun. 6, 2017

(65) Prior Publication Data
US 2018/0017856 A1    Jan. 18, 2018

(30) Foreign Application Priority Data

Jul. 12, 2016  (JP) ................................. 2016-137293
Apr. 3, 2017   (JP) ................................. 2017-073479

(51) Int. Cl.
*G03B 21/20* (2006.01)
*H04N 9/31* (2006.01)

(52) U.S. Cl.
CPC ......... *G03B 21/204* (2013.01); *H04N 9/3105* (2013.01); *H04N 9/3158* (2013.01); *H04N 9/3167* (2013.01)

(58) Field of Classification Search
CPC .. G03B 21/204; H04N 9/3105; H04N 9/3158; H04N 9/3167
See application file for complete search history.

(56) References Cited

U.S. PATENT DOCUMENTS 8,733,940 B2 * 5/2014 Tanaka ................... G03B 21/28
                                                        353/20
8,915,597 B2 * 12/2014 Kitano ................. H04N 9/3105
                                                        353/94
(Continued)

FOREIGN PATENT DOCUMENTS

JP    2012-137744    7/2012
JP    2014-209184    11/2014
JP    2015-203857    11/2015

OTHER PUBLICATIONS

Handbook of Optics vol. 3 2nd Ed.*
Office Action dated Nov. 10, 2017 in Philippine Application No. 1-2017-000156.

*Primary Examiner* — Bao-Luan Q Le
(74) *Attorney, Agent, or Firm* — Wenderoth, Lind & Ponack, L.L.P.

(57) ABSTRACT

A first light source device includes: a solid-state light source; a condenser element that collects light from the solid-state light source; a retardation plate that converts linearly polarized light into circularly polarized light; and a reflection plate, wherein the retardation plate is disposed at a point of incidence of collected light and divergent light between the condenser element and the reflection plate. A second light source device includes: a solid-state light source; a retardation plate that changes a polarization direction of light from the solid-state light source to make a ratio of polarization and s-polarization components of the light constant under control; and a dichroic mirror that separates the light from the retardation according to the polarization direction, wherein the retardation plate is disposed at a point of incidence of one of collected light and divergent light between the solid-state light source and the dichroic mirror.

11 Claims, 7 Drawing Sheets

(56) References Cited

U.S. PATENT DOCUMENTS

| | | | |
|---|---|---|---|
| 9,429,831 B2* | 8/2016 | Akiyama | G03B 21/2073 |
| 9,500,937 B2* | 11/2016 | Tanaka | G03B 21/204 |
| 9,500,941 B2* | 11/2016 | Akiyama | G03B 21/208 |
| 9,568,817 B2* | 2/2017 | Akiyama | H04N 9/3164 |
| 9,645,481 B2* | 5/2017 | Tanaka | G03B 21/208 |
| 9,759,991 B2* | 9/2017 | Sheng | G03B 21/2073 |
| 2012/0081672 A1* | 4/2012 | Okuda | H04N 9/3114 |
| | | | 353/20 |
| 2012/0133903 A1* | 5/2012 | Tanaka | G03B 21/2013 |
| | | | 353/31 |
| 2012/0140183 A1* | 6/2012 | Tanaka | G03B 21/28 |
| | | | 353/20 |
| 2012/0268917 A1* | 10/2012 | Kitano | H04N 9/3105 |
| | | | 362/84 |
| 2013/0088471 A1* | 4/2013 | Kitano | H04N 9/3114 |
| | | | 345/208 |
| 2013/0107223 A1* | 5/2013 | Toyooka | G03B 21/2033 |
| | | | 353/31 |
| 2013/0229628 A1 | 9/2013 | Akiyama et al. | |
| 2014/0268063 A1* | 9/2014 | Akiyama | G03B 21/204 |
| | | | 353/20 |
| 2014/0293232 A1* | 10/2014 | Tanaka | G03B 21/204 |
| | | | 353/20 |
| 2015/0098065 A1* | 4/2015 | Tanaka | G03B 21/2013 |
| | | | 353/84 |
| 2015/0153020 A1* | 6/2015 | Akiyama | H04N 9/3194 |
| | | | 353/20 |
| 2015/0301438 A1* | 10/2015 | Akiyama | G03B 21/2033 |
| | | | 353/20 |
| 2016/0011497 A1* | 1/2016 | Akiyama | G03B 21/204 |
| | | | 353/31 |
| 2016/0062221 A1* | 3/2016 | Matsubara | G03B 21/2013 |
| | | | 353/31 |
| 2016/0062223 A1* | 3/2016 | Akiyama | H04N 9/3152 |
| | | | 353/31 |
| 2016/0077419 A1* | 3/2016 | Sheng | G03B 21/2073 |
| | | | 353/20 |
| 2016/0131967 A1* | 5/2016 | Saitou | F21V 5/008 |
| | | | 353/31 |
| 2016/0238923 A1* | 8/2016 | Tanaka | G02B 26/007 |
| 2016/0259234 A1* | 9/2016 | Akiyama | F21V 7/0033 |
| 2016/0370696 A1* | 12/2016 | Akiyama | G03B 21/2066 |
| 2017/0013240 A1* | 1/2017 | Chikahisa | G02B 5/3083 |
| 2017/0082912 A1* | 3/2017 | Wakabayashi | G02B 26/008 |

* cited by examiner

LIGHT SOURCE DEVICE AND PROJECTION DISPLAY APPARATUS INCLUDING PLURAL LIGHT SOURCES, AND A LENS CONDENSING LIGHT FROM THE PLURAL LIGHT SOURCES INTO ONE SPOT

BACKGROUND

1. Technical Field

The present disclosure relates to a projection display apparatus which illuminates an image formed on a small light bulb with illumination light and magnifies and projects the image on a screen through a projection lens.

2. Description of the Related Art

A large number of light source devices which use solid-state light sources having a long operating life such as semiconductor lasers and light-emitting didoes are disclosed as light sources of projection display apparatuses that use mirror-deflecting digital micromirror devices (DMDs) and light bulbs of liquid-crystal panels. Among those, a light source device which is small and efficiently collects light from a solid-state light source by utilizing polarization properties of the light emitted from the solid-state light source is disclosed in Patent Literature (PTL) 1.

PTL 2 discloses a small, high-efficiency light source device which uses a half-wave plate that changes the polarization direction of light from solid-state light source to make the ratio of p-polarization and s-polarization components of the light entering a dichroic mirror constant under control.

CITATION LIST

Patent Literature

PTL 1: Unexamined Japanese Patent Publication No. 2012-137744
PTL 2: Unexamined Japanese Patent Publication No. 2014-209184

SUMMARY

The present disclosure provides a light source device which utilizes polarization properties of light emitted from a solid state light source and uses a low-cost retardation plate having excellent durability and a projection display apparatus which uses the light source device.

A first light source device in the present disclosure includes: a solid-state light source; a condenser element that collects light from the solid-state light source; a retardation plate that converts linearly polarized light into circularly polarized light; and a reflection plate, wherein the retardation plate is disposed at a point of incidence of collected light and divergent light between the condenser element and the reflection plate.

A second light source device in the present disclosure includes: a solid-state light source; a retardation plate that changes a polarization direction of light from the solid-state light source to make a ratio of p-polarization and s-polarization components of the light constant under control; and a dichroic mirror that separates the light from the retardation plate according to the polarization direction, wherein the retardation plate is disposed at a point of incidence of one of collected light and divergent light between the solid-state light source and the dichroic mirror.

A third light source device in the present disclosure includes: a solid-state light source; a first retardation plate that changes a polarization direction of light from the solid-state light source to make a ratio of p-polarization and s-polarization components of the light constant under control; a dichroic mirror that separates the light from the first retardation plate according to the polarization direction; a condenser element that collects the light from the dichroic mirror; a second retardation plate that converts linearly polarized light into circularly polarized light; and a reflection plate, wherein the first retardation plate is disposed at a point of incidence of one of collected light and divergent light between the solid-state light source and the dichroic mirror, and the second retardation plate is disposed at a point of incidence of collected light and divergent light between the condenser element and the reflection plate.

According to the present disclosure, a small, inexpensive light source device can be configured by disposing the retardation plate in a position in which light is collected, and thus it is possible to provide a low-cost, bright projection display apparatus having a long operating life.

DETAILED DESCRIPTION

Hereinafter, exemplary embodiments will be described in detail with reference to the drawings as necessary. However, there are instances where overly detailed description is omitted. For example, detailed description of well-known matter, overlapping description of substantially identical elements, etc., may be omitted. This is to prevent the subsequent description from becoming unnecessarily redundant, and thus facilitate understanding by a person having ordinary skill in the art.

Note that the accompanying drawings and the subsequent description are provided so that a person having ordinary skill in the art is able to sufficiently understand the present disclosure, and are not intended to limit the scope of the subject matter recited in the claims.

First Exemplary Embodiment

Figure 1:
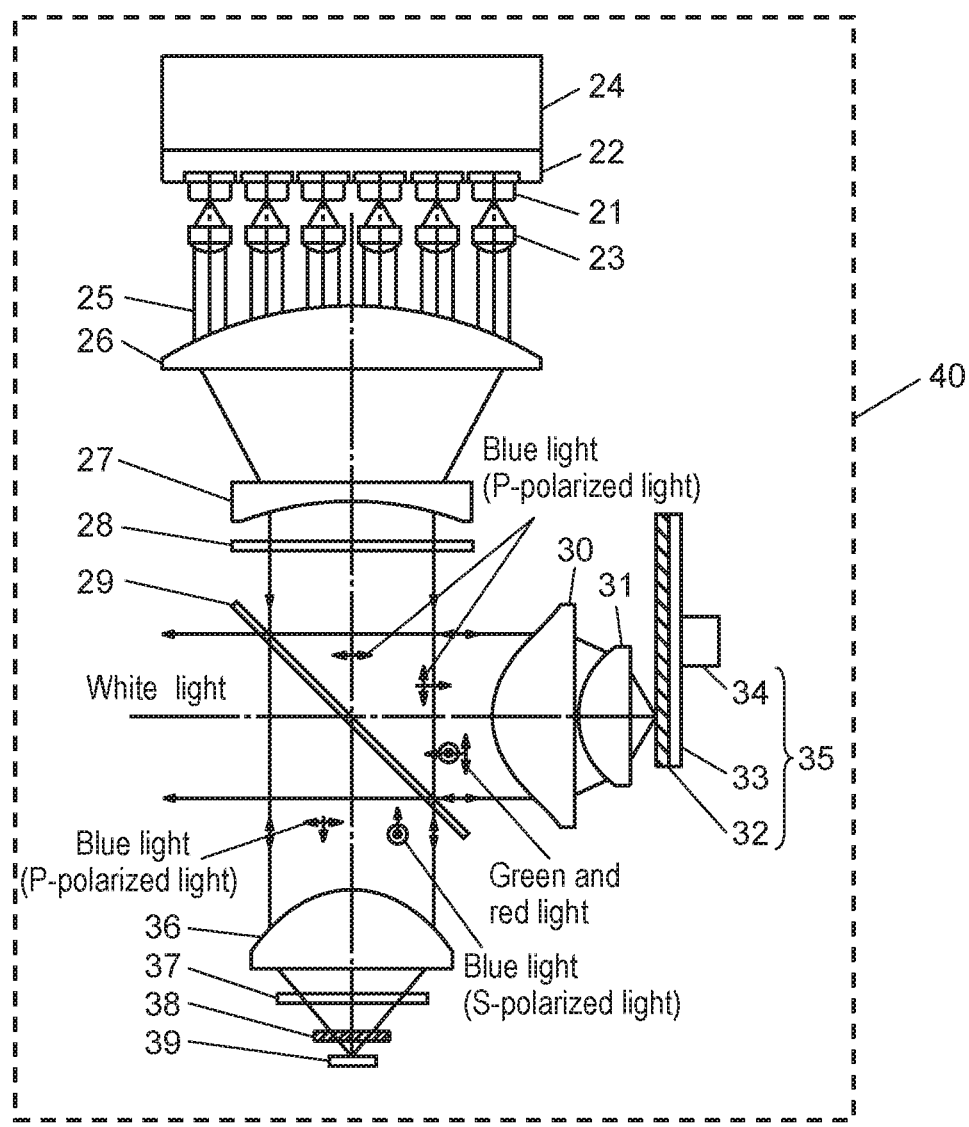
FIG. 1 is a configuration diagram of a light source device according to the first exemplary embodiment of the present disclosure.

FIG. 1 is a configuration diagram of a light source device according to the first exemplary embodiment of the present disclosure. Light source device 40 according to the first exemplary embodiment includes: semiconductor laser 21, which is a solid-state light source; heat-dissipating plate 22; condenser lens 23; heat sink 24; lens 26; lens 27; first diffusion plate 28; dichroic mirror 29; condenser lenses 30 and 31, each of which is a first condenser element; phosphor plate 35 including motor 34 and aluminum substrate 33 having a reflection film and phosphor layer 32; condenser lens 36, which is a second condenser element; second diffusion plate 37; quarter-wave plate 38, which is a retardation plate; and reflection plate 39. A model of each light flux 25 emitted from the solid-state light source and polarization directions of light entering dichroic mirror 29 and emitted therefrom are illustrated in FIG. 1.

On heat-dissipating plate 22, 24 (6×4) semiconductor lasers 21 and light-collecting lenses 23 are two-dimensionally arranged at regular intervals in a square form. Heat sink 24 is for cooling semiconductor lasers 21. Semiconductor laser 21 radiates blue light in the wavelength range from 447 nm to 462 nm and emits linearly polarized light. Each semiconductor laser is disposed so that the polarized light emitted from semiconductor laser 21 becomes p-polarized light with respect to the plane of incidence of dichroic mirror 29.

The light emitted from the plurality of semiconductor lasers 21 is collected by corresponding light-collecting lenses 23 and converted into parallel light fluxes 25. The group of light fluxes 25 is further reduced in diameter through convex lens 26 and concave lens 27 before entering first diffusion plate 28. First diffusion plate 28, which is made of glass, diffuses light by a finely textured surface. The diffusion angle of the diffused light, which is the half angle width at which the diffused light has 50% of the maximum intensity, is as small as about three degrees, and thus the polarization properties are retained. The light emitted from first diffusion plate 28 enters dichroic mirror 29.

Figure 2:
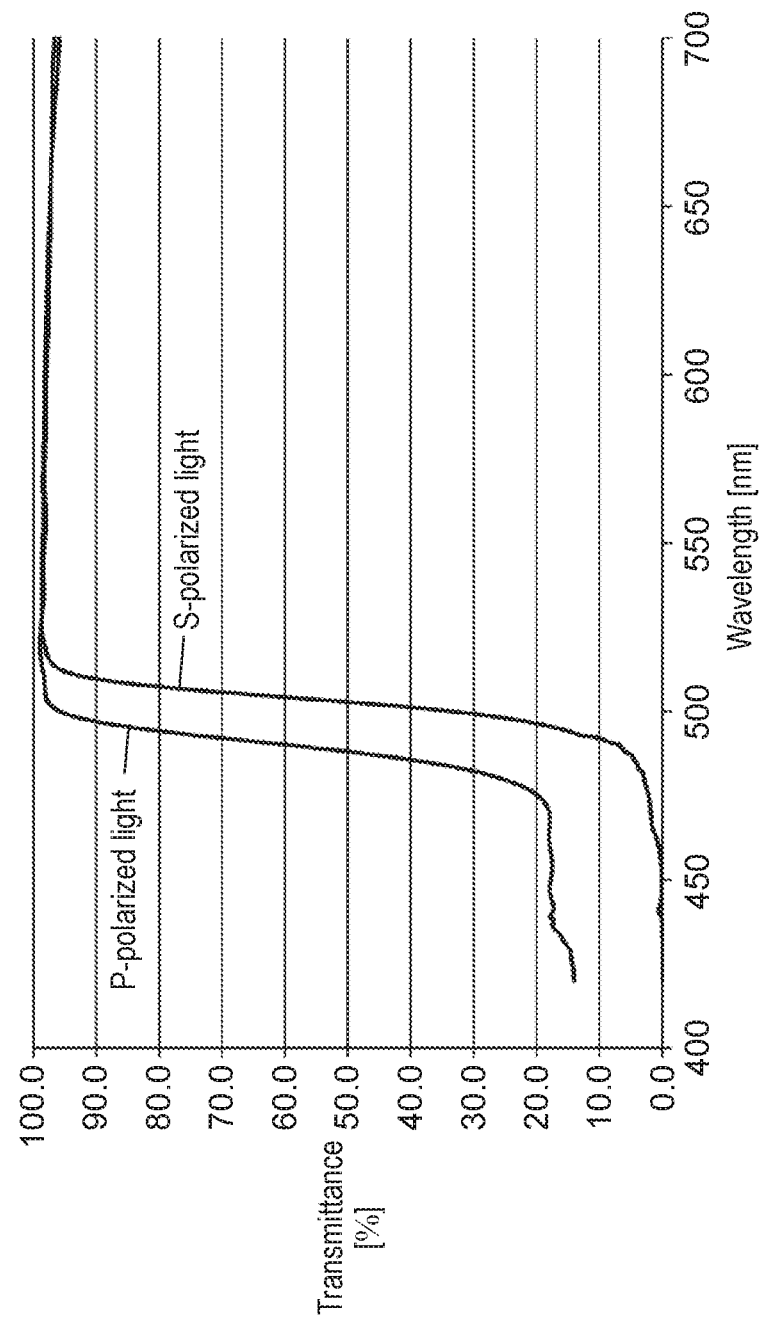
FIG. 2 shows spectral properties of a dichroic mirror according to the first exemplary embodiment.

FIG. 2 shows spectral properties of the dichroic mirror. The spectral properties indicate transmittance with respect to wavelengths. The spectral properties of the dichroic mirror are properties of transmitting the p-polarized light originating from the semiconductor laser light having a wavelength of 447 nm to 462 nm at a constant ratio (18% on average) and reflecting said light at a constant ratio (82% on average) with high reflectivity of 95% or more for the s-polarized light originating from said semiconductor laser light. Furthermore, the properties allow each of p-polarized green and red light and s-polarized green and red light to pass with high transmittance of 96% or more.

Condenser lenses 30 and 31 collect the 82% p-polarized blue light reflected off dichroic mirror 29, and when the diameter of light having intensity of 13.5% of peak intensity is defined as a spot diameter, the collected light is superimposed on spot light having a spot diameter or 1.5 mm to 2.5 mm and enters phosphor plate 35. First diffusion plate 28 diffuses the light so that the diameter of the spot light has a desired diameter.

Phosphor plate 35 is a circular, rotatable and controllable substrate that includes motor 34 in a central area and aluminum substrate 33 having a reflection film and phosphor layer 32. The reflection film of phosphor plate 35, which is a metal film or a dielectric film that reflects visible light, is formed on aluminum substrate 33. Furthermore, phosphor layer 32 is formed on the reflection film. Phosphor layer 32 has a Ce-activated YAG yellow phosphor which is excited by blue light and radiates yellow light containing green and red components. A representative chemical composition of the crystal matrix of this phosphor is $Y_3Al_5O_{12}$. Phosphor layer 32 is formed in a circular annular shape. Phosphor layer 32 excited by the spot light radiates yellow light including light containing green and red components. Phosphor plate 35, which is an aluminum substrate, can be rotated to inhibit a temperature rise in phosphor layer 32 that is caused by excitation light, and thus stably maintain the phosphor conversion efficiency.

The light incident on phosphor layer 32 results in colored fluorescence including green and red components and then is emitted from phosphor plate 35. The light radiated on the reflection film side is reflected off the reflection film and then emitted from phosphor plate 35. The green and red light emitted from phosphor plate 35 becomes natural light (non-polarized light), and then is collected again by condenser lenses 30 and 31 and converted into substantially parallel light, thereafter being transmitted by dichroic mirror 29.

Meanwhile, the 18% p-polarized blue light transmitted by dichroic mirror 29 enters condenser lens 36, which is the second condenser element, and is collected, resulting in collected light. The focal length of condenser lens 36 is set so that the converging angle thereof becomes 40 degrees or less, and a light collection spot is formed near reflection plate 39. The light collected by condenser lens 36 enters second diffusion plate 37. Second diffusion plate 37 diffuses incident light to equalize the light intensity distribution and solve the issue of speckles of the laser light. Second diffusion plate 37 has a finely textured diffusion surface formed on a glass surface of a thin plate. Second diffusion plate 37 has a diffusion angle of approximately four degrees for light transmitted one time by the diffusion surface, and thus maintains the polarization properties. The light transmitted by second diffusion plate 37 enters quarter-wave plate 38, which is the retardation plate. Quarter-wave plate 38 is a retardation plate through which a phase difference around the central emission wavelength of semiconductor laser 21 is one-fourth of a wavelength.

Assuming that the direction of the p-polarized light is at zero degrees, the optical axis of quarter-wave plate 38 is positioned at 45 degrees. Quarter-wave plate 38 is a thin-film retardation plate that uses birefringence due to oblique vapor deposition of a dielectric material (see Unexamined Japanese Patent Publication No. 2012-242449). The thin-film retardation plate includes an inorganic material, thus having excellent durability and reliability as is an inorganic optical crystal such as quartz. In addition, since a thin-film wave plate is formed by stacking layers with a sufficiently smaller thickness than the wavelength of light, the thin-film wave plate serves as a retardation plate having single optical axis for the whole of obliquely vapor deposited layers. Thus, a change in the phase difference with respect to the angle of incidence is significantly smaller than that of a retardation plate including an inorganic optical crystal such as quartz.

Figure 3:
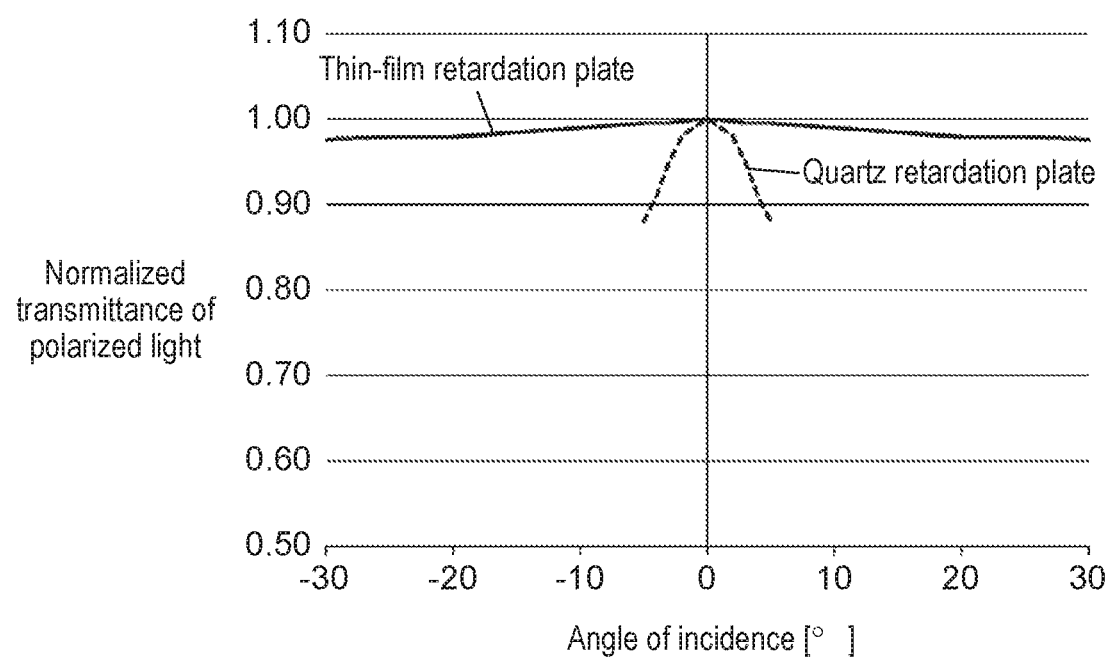
FIG. 3 shows angle-dependent properties of polarized light transmittance of a retardation plate.

FIG. 3 shows one example of angle dependence of polarized light transmittance of each of the thin-film retardation plate (the solid line) and a quartz retardation plate (the dashed line). In the figure, it is assumed that the transmittance of one of linear polarization components of linearly polarized light incident on the retardation plate after the linearly polarized light is converted into circularly polarized light is defined as polarized light transmittance, and the polarized light transmittance is plotted with respect to the angle of incidence. This is a graph normalized by setting the polarized light transmittance where the angle of incidence is zero degrees to 1.0. The polarized light transmittance of the thin-film retardation plate drops by 6% in the range of the angle of incidence from −30 degrees to +30 degrees while the polarized light transmittance of the quartz retardation plate drops by 12% in the range of the angle of incidence from −5 degrees to +5 degrees. The thin-film retardation plate is a retardation plate having a very small dependence on the angle of incidence and can therefore convert linearly polarized incident light into circularly polarized light with high efficiency even when the thin-film retardation plate is disposed at a point of incidence of collected light or divergent light. Furthermore, since quarter-wave plate 38 is disposed at a point of incidence of collected light or divergent light, the size of the quarter-wave plate can be reduced to half or less and the cost for the quarter-wave plate can be significantly reduced as compared to an existing case where the quarter-wave plate is disposed at a point of incidence of parallel light.

The circularly polarized light resulting from the conversion by quarter-wave plate 38 is inverted in phase by reflection plate 39 having a reflection film such as aluminum or a multilayer dielectric film, thus becomes divergent light as the light circularly polarized in the reverse direction, and is converted into s-polarized light through quarter-wave plate 38. Furthermore, since no member that distorts the polarized light is disposed between quarter-wave plate 38 and reflection plate 39, it is possible to convert the p-polarized light into the s-polarized light with high efficiency.

The s-polarized light resulting from the conversion by quarter-wave plate 38 is diffused again by second diffusion plate 37, then converted into parallel light by condenser lens 36, and reflected off dichroic mirror 29.

In this way, the fluorescence light from phosphor plate 35 and the blue light resulting from efficient polarization conversion are combined by dichroic mirror 29 and thus emitted as white light. The yellow light containing fluorescent green and red components and the blue light from semiconductor laser 21 can lead to emission properties with a good white balance. Even when an optical system in the projection display apparatus separates light having such spectral emission properties into three primary color—blue, green, and red—rays, it is possible to obtain single-colored light having desired chromaticity coordinates.

Although the thin-film retardation plate is used as the quarter-wave plate in the above description, it may be possible to use a microstructural retardation plate that uses birefringence exhibited due to a microscopic, periodic structure of a size not greater than the wavelength of light. Since the microstructural retardation plate has a microscopic structure of a size not greater than the wavelength of light, the polarized light transmittance thereof has a small dependence on the angle of incidence as does the thin-film retardation plate shown in FIG. 3, and thus the microstructural retardation plate can be disposed at a point of incidence of collected light.

As described above, the light source device in the present disclosure separates light from the plurality of semiconductor lasers by the dichroic mirror and efficiently collects and combines green and red light radiated by being excited by one of the rays resulting from the separation, and the blue light that is the other of the rays resulting from the polarization conversion through the small retardation plate disposed at a point of incidence of collected light, to obtain white light; thus, a small, efficient, inexpensive light source device can be configured.

Second Exemplary Embodiment

Figure 4:
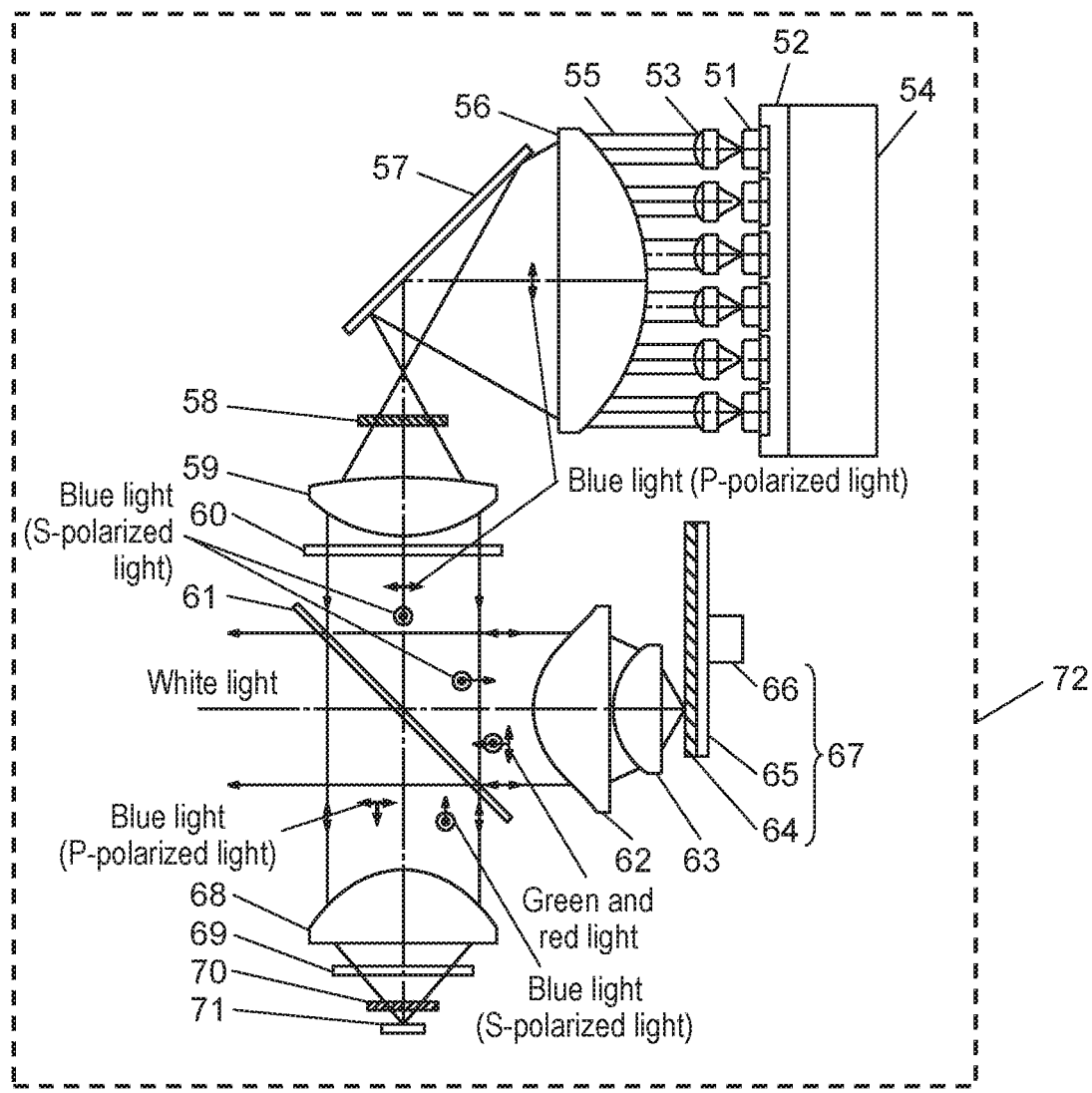
FIG. 4 is a configuration diagram of a light source device according to the second exemplary embodiment of the present disclosure.

FIG. 4 is a configuration diagram of a light source device according to the second exemplary embodiment of the present disclosure.

Light source device 72 according to the second exemplary embodiment includes: semiconductor laser 51; heat-dissipating plate 52; light-collecting lens 53; heat sink 54; condenser lenses 56 and 59; mirror 57; half-wave plate 58, which is a first retardation plate; first diffusion plate 60; dichroic mirror 61; condenser lenses 62 and 63, each of which is the first condenser element; phosphor plate 67; condenser lens 68, which is the second condenser element; second diffusion plate 69; quarter-wave plate 70, which is a second retardation plate; and reflection plate 71. A model of each light flux 55 emitted from the solid-state light source and polarization directions of light entering dichroic mirror 61 and emitted therefrom are illustrated in this figure. Phosphor plate 67 includes motor 66 and aluminum substrate 65 having a reflection film and phosphor layer 64.

Elements that are the same as or similar to those in light source device 40 according to the first exemplary embodiment of the present disclosure are: semiconductor laser 51; heat-dissipating plate 52; light-collecting lens 53; heat sink 54; first diffusion plate 60; condenser lenses 62 and 63; phosphor plate 67; condenser lens 68; second diffusion plate 69; quarter-wave plate 70, which is the second retardation plate; reflection plate 71.

On heat-dissipating plate 52, 24 (6×4) semiconductor lasers 51 and light-collecting lenses 53 are two-dimensionally arranged at regular intervals in a square form. Heat sink 54 is for cooling semiconductor lasers 51. Semiconductor laser 51 radiates blue light in the wavelength range from 447 nm to 462 nm and emits linearly polarized light. In FIG. 4, each semiconductor laser is disposed so that the polarized light emitted from semiconductor laser 51 becomes p-polarized light with respect to the plane of incidence of dichroic mirror 61 in the state where no retardation plate is interposed. The light emitted from the plurality of semiconductor lasers 51 is collected by corresponding light-collecting lenses 53 and converted into parallel light fluxes 55. The group of light fluxes 55 is collected by convex condenser lens 56 and reflected off mirror 57. The reflected collected light is collected, then becomes divergent light, and enters half-wave plate 58, which is the first retardation plate. The light entering half-wave plate 58 has an angle of incidence of 40 degrees or less. Half-wave plate 58 is a retardation plate through which a phase difference around the central emission wavelength of semiconductor laser 51 is one-half of a wavelength. Assuming that the direction of the p-polarized light in FIG. 4 is at zero degrees, the optical axis of half-wave plate 58 is positioned at 32.5 degrees. An adjustment mechanism is provided for half-wave plate 58 in the direction of rotation so that the positioning angle of the optical axis thereof can be adjusted.

The polarization direction of the p-polarized light from semiconductor laser 51 is changed to 65 degrees by half-wave plate 58, resulting in the light intensity of the p-polarization component being 18% and the light intensity of the s-polarization component being 82%.

Half-wave plate 58 is a thin-film retardation plate that uses birefringence due to oblique vapor deposition of a dielectric material. The thin-film retardation plate includes an inorganic material, thus having excellent durability and reliability as is an inorganic optical crystal such as quartz. In addition, since a thin-film wave plate formed by stacking layers with a sufficiently smaller thickness than the wavelength of light, a change in the phase difference with respect to the angle of incidence of light is significantly smaller than that of a retardation plate including an inorganic optical crystal such as quartz. Therefore, the direction of the p-polarized light from semiconductor laser 51 can be rotated and changed with high efficiency even when the thin-film wave plate is disposed at a point of incidence of collected or diverging light. Furthermore, since half-wave plate 58 is disposed at a point of incidence of collected light, the size of the half-wave plate can be reduced to half or less and the cost for the half-wave plate can be significantly reduced as compared to an existing case where the half-wave plate is disposed at a point of incidence of parallel light.

The light transmitted by half-wave plate 58 is converted into substantial parallel light by condenser lens 59, enters first diffusion plate 60 and is diffused before entering dichroic mirror 61.

Figure 5:
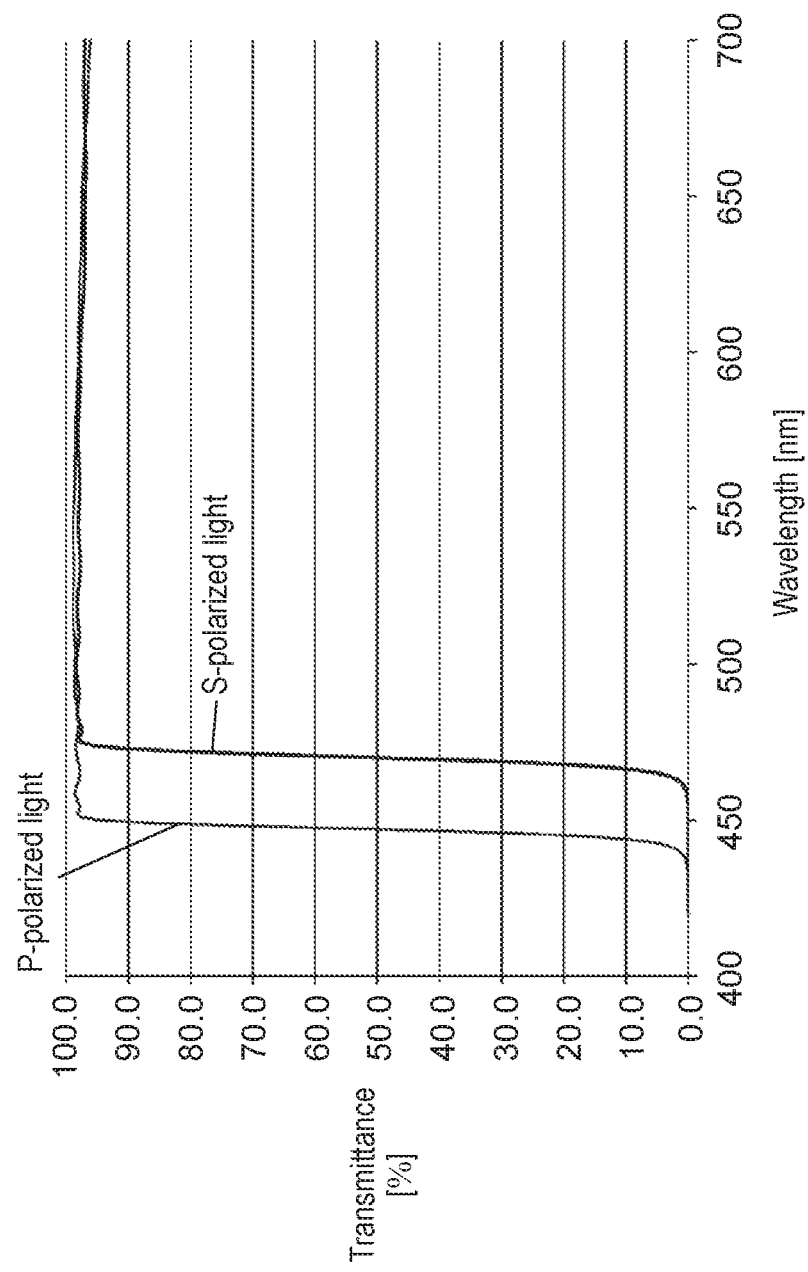
FIG. 5 shows spectral properties of a dichroic mirror according to the second exemplary embodiment.

FIG. 5 shows spectral transmittance properties of dichroic mirror 61. Dichroic mirror 61 has such properties that the transmittance thereof for the s-polarized light having a wavelength of 465 nm and the p-polarized light having a wavelength of 442 nm is 50% and that the blue light is transmitted and reflected while the colored light containing green and red components is transmitted with transmittance of 96% or more. The s-polarization component of light entering dichroic mirror 61 is reflected while the p-polarization component thereof is transmitted. The optical axis of half-wave plate 58 is positioned at 32.5 degrees, and thus the polarization direction of the polarized incident light is 65 degrees, resulting in the light intensity of the s-polarization component being 82% and the light intensity of the p-polarization component being 18%.

Condenser lenses 62 and 63 collect the s-polarized light reflected off dichroic mirror 61, and the collected light is superimposed on spot light having a diameter of 1.5 mm to 2.5 mm with light intensity of 13.5% of peak intensity and enters phosphor plate 67. First diffusion plate 60 diffuses the light so that the diameter of the spot light has a desired diameter. Phosphor plate 67 is a circular, rotatable and controllable substrate that includes motor 66 in a central area and aluminum substrate 65 having a reflection film and phosphor layer 64. The reflection film of phosphor plate 67, which is a metal film or a dielectric film that reflects visible light, is formed on the aluminum substrate. Furthermore, phosphor layer 64 is formed on the reflection film. Phosphor layer 64 has a Ce-activated YAC yellow phosphor which is excited by blue light and radiates yellow light containing green and red components. A representative chemical composition of the crystal matrix of this phosphor is $Y_3Al_5O_{12}$. Phosphor layer 64 is formed in a circular annular shape.

Phosphor layer 64 excited by the spot light radiates yellow light including light containing green and red components. Phosphor plate 67, which is an aluminum substrate, can be rotated to inhibit a temperature rise in phosphor layer 64 that is caused by excitation light, and thus stably maintain the phosphor conversion efficiency. The light incident on phosphor layer 64 results in colored fluorescence including green and red components and then is emitted from phosphor plate 67. The light radiated on the reflection film side is reflected off the reflection film and then emitted from phosphor plate 67. The green and red light emitted from phosphor plate 67 becomes natural light, and then is collected again by condenser lenses 62 and 63 and converted into substantially parallel light, thereafter being transmitted by dichroic mirror 61.

Meanwhile, the 18% p-polarized blue light transmitted by dichroic mirror 61 enters condenser lens 68, which is the second condenser element, and is collected. The focal length of condenser lens 68 is set so that the converging angle thereof becomes 40 degrees or less, and a light collection spot is formed near reflection plate 71. The light collected by condenser lens 68 enters second diffusion plate 69. Second diffusion plate 69 diffuses incident light to equalize the light intensity distribution and solve the issue of speckles of the laser light. Second diffusion plate 69 has a finely textured diffusion surface formed on a glass surface of a thin plate. Second diffusion plate 69 has a diffusion angle of approximately four degrees for light transmitted one time by the diffusion surface, and thus maintains the polarization properties.

The light transmitted by second diffusion plate 69 enters quarter-wave plate 70, which is the second retardation plate. Quarter-wave plate 70 is a retardation plate through which a phase difference around the central emission wavelength of semiconductor laser 51 is one-fourth of a wavelength. Assuming that the direction of the p-polarized light in FIG. 4 is at zero degrees, the optical axis of quarter-wave plate 70 is positioned at 45 degrees. Quarter-wave plate 70 is a thin-film retardation plate that uses birefringence due to oblique vapor deposition of a dielectric material. The thin-film retardation plate includes an inorganic material, thus having excellent durability and reliability as is an inorganic optical crystal such as quartz.

The circularly polarized light resulting from the conversion by quarter-wave plate 70 is inverted in phase by reflection plate 71 having a reflection film such as aluminum or a multilayer dielectric film, thus becomes divergent light as the light circularly polarized in the reverse direction, and is converted into s-polarized light through quarter-wave plate 70. Furthermore, since no member that distorts the polarized light is disposed between quarter-wave plate 70 and reflection plate 71, it is possible to convert the p-polarized light into the s-polarized light with high efficiency.

The s-polarized light resulting from the conversion by quarter-wave plate 70 is diffused again by second diffusion plate 69, then converted into parallel light by condenser lens 68, and reflected off dichroic mirror 61.

In this way, the fluorescence light from phosphor plate 67 and the blue light resulting from efficient polarization conversion are combined by dichroic mirror 61 and thus emitted as white light. The yellow light containing fluorescent green and red components and the blue light from semiconductor laser 51 can lead to emission properties with a good white balance. Even when an optical system in the projection display apparatus separates light having such spectral emission properties into three primary color—blue, green, and red—rays, it is possible to obtain single-colored light having desired chromaticity coordinates.

In the first exemplary embodiment of the present disclosure, the separation ratio of blue light depends on the transmittance properties of dichroic mirror 29 for the blue wave band and a slight variation occurs in the separation ratio. Meanwhile, in the second exemplary embodiment of the present disclosure, the separation ratio of blue light transmitted or reflected off dichroic mirror 61 is controlled using half-wave plate 58 having an optical axis, the positioning angle of which can be adjusted, and thus the variation in the separation ratio is very small. Accordingly, the variation in white balance properties becomes very small.

Although the thin-film retardation plate is used as half-wave plate 58 in the above description, it may be possible to use a microstructural retardation plate that uses birefringence exhibited due to a microscopic, periodic structure of a size not greater than the wavelength of light.

Although half-wave plate 58 is used as the first retardation plate in the second exemplary embodiment, a quarter-wave plate may be used as the first retardation plate by being disposed so that the polarized light emitted from semiconductor laser 51 becomes s-polarized light, and adjusting the positioning angle of the optical axis so that the ratio of the s-polarization component and the p-polarization component of the transmitted blue light becomes a predetermined ratio.

Furthermore, although the configuration in which half-wave plate 58 is disposed at a point of incidence of divergent light, as illustrated in FIG. 4, is described in the second exemplary embodiment, half-wave plate 58 may be disposed at a point of incidence of collected light. For example, half-wave plate 58 may be disposed in front of a position in which the collected light reflected off mirror 57 is collected.

As described above, the light source device in the present disclosure separates according to the polarization direction, at a constant ratio, light from the plurality of semiconductor lasers by the dichroic mirror and the small half-wave plate disposed at the point of incidence of the collected light or the divergent light, efficiently collects and combines the yellow light containing the green and red light radiated by being excited by one of the rays resulting from the polarization and separation, and the blue light that is the other of the rays, to obtain white light; thus, a small, efficient, inexpensive light source device with a small variation in the white balance can be configured.

Third Exemplary Embodiment

Figure 6:
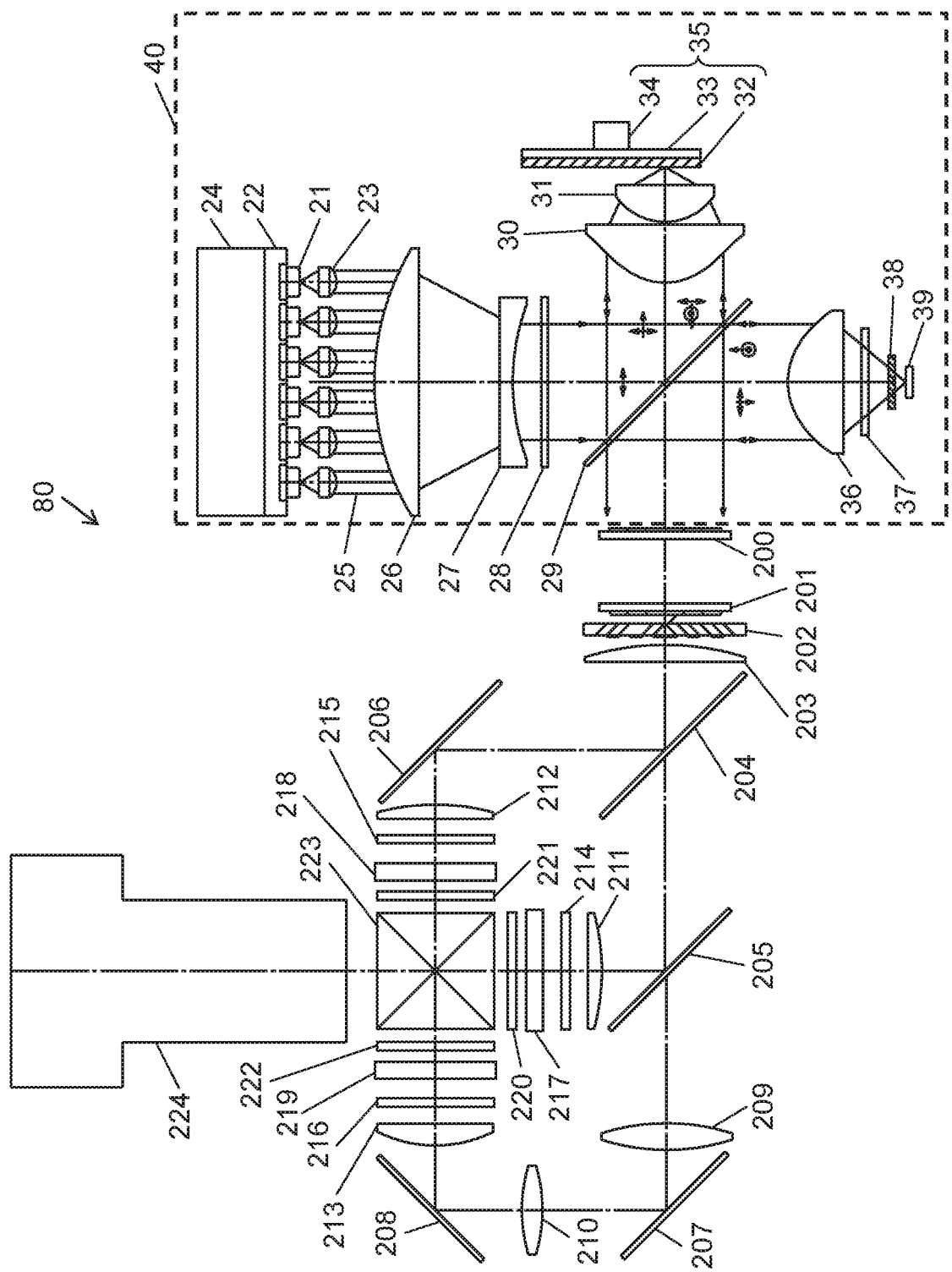
FIG. 6 is a configuration diagram of a projection display apparatus according to the third exemplary embodiment of the present disclosure.

FIG. 6 is a configuration diagram of a first projection display apparatus according to the third exemplary embodiment of the present disclosure. As an image forming element, an active-matrix, transmissive liquid-crystal panel in the twisted nematic (TN) mode or the vertical alignment (VA) mode in which a thin film transistor is formed in a pixel region is used.

Light source device 40 includes: blue semiconductor laser 21; heat-dissipating plate 22; light-collecting lens 23; heat sink 24; lenses 26 and 27; first diffusion plate 28; dichroic mirror 29; condenser lenses 30 and 31; phosphor plate 35 including motor 34 and aluminum substrate 33 having a reflection film and phosphor layer 32; condenser lens 36; second diffusion plate 37; quarter-wave plate 38; and reflection plate 39. This light source device is light source device 40 according to the first exemplary embodiment of the present disclosure, and therefore overlapping description thereof will be omitted.

Projection display apparatus 80 according to the third exemplary embodiment further includes: first lens array plate 200; second lens array plate 201; polarization conversion element 202; superimposition lens 203; blue reflection dichroic mirror 204; green reflection dichroic mirror 205; reflection mirrors 206, 207, and 208; relay lenses 209 and 210; field lenses 211, 212, and 213; incidence-side polarizing plates 214, 215, and 216; liquid-crystal panels 217, 218, and 219; emission-side polarizing plates 220, 221, and 222; color-combining prism 223 including a red reflection dichroic mirror and a blue reflection dichroic mirror; and projection lens 224.

The white light from light source device 40 enters first lens array plate 200 including a plurality of lens elements. The beam incident on first lens array plate 200 is split into a large number of beams. The large number of beams resulting from the splitting converges on second lens array plate 201 including the plurality of lens elements. The lens elements of first lens array plate 200 have an opening shape similar to those of liquid-crystal panels 217, 218, and 219. The focal length of each of the lens elements of second lens array plate 201 is determined so that first lens array plate 200 and liquid-crystal panels 217, 218, and 219 have a substantial conjugate relation.

The light emitted from second lens array plate 201 enters polarization conversion element 202. Polarization conversion element 202 includes a polarization separation prism and a half-wave plate and converts natural light from the light source into light in one polarization direction. The fluorescence light is natural light and therefore converted into light in one polarization direction, but blue light is s-polarized light upon entry and subject to no polarization conversion, resulting in the s-polarized light being emitted.

The light from polarization conversion element 202 enters superimposition lens 203. Superimposition lens 203 is for superimposing light emitted from each of the lens elements of second lens array plate 201 onto liquid-crystal panels 217, 218, and 219 as illumination light. First lens array plate 200, second lens array plate 201, polarization conversion element 202, and superimposition lens 203 serve as an illumination optical system.

The light from superimposition lens 203 is separated into rays of blue, green, and red light by blue reflection dichroic mirror 204 and green reflection dichroic mirror 205, each of which is a color separation element. The green light enters liquid-crystal panel 217 through field lens 211 and incidence-side polarizing plate 214. The blue light is reflected off reflection mirror 206 and then enters liquid-crystal panel 218 through field lens 212 and incidence-side polarizing plate 215. The red light is transmitted or refracted and reflected by relay lenses 209 and 210, reflection mirrors 207 and 208, etc., and enters liquid-crystal panel 219 through field lens 213 and incidence-side polarizing plate 216.

Three liquid-crystal panels 217, 218, and 219 change the polarization state of incident light by controlling voltage to be applied to a pixel according to a video signal, modulate the light by a combination of incidence-side polarizing plate 214, 215, and 216 and emission-side polarizing plates 220, 221, and 222 disposed on the both sides of respective liquid-crystal panels 217, 218, and 219 so that the transmission axes thereof are orthogonal to one another, and thus form green, blue, and red images. The light of each color transmitted by emission-side polarizing plates 220, 221, and 222 enters projection lens 224 after the red light and the blue light are reflected off the red reflection dichroic mirror and the blue reflection dichroic mirror, respectively, and combined with the green light by color-combining prism 223. The light incident on projection lens 224 is magnified and projected on a screen (not illustrated in the drawings).

The light source device is configured small with the plurality of solid-state light sources and emits highly efficient white light having a good white balance, and thus it is possible to provide a projection display apparatus having a long operating life with high luminance. Furthermore, the three liquid-crystal panels that use polarized light, instead of the time division system, are used for the image forming element, and thus it is possible to obtain a bright, high definition projection image with no color breaking and good color reproducibility. In addition, compared to the case where three DMD elements are used, a total reflection prism is not needed, and the prism for combining colors is a small, 45-degree incidence prism, allowing the projection display apparatus to be configured small.

As described above, the first projection display apparatus in the present disclosure uses the light source device including the solid-state light source, which is a semiconductor laser, and the dichroic mirror that can separate p-polarized light originating from semiconductor laser light at a constant ratio of intensity and combine the yellow light containing green and red components radiated by being excited by one of the rays resulting from the separation and the blue light obtained by efficient polarization conversion of the other of the rays resulting from the separation by the small quarter-wave plate, to obtain white light. Thus, a small, inexpensive projection display apparatus can be configured. Although light source device 40 illustrated in FIG. 1 is used as the light source device, light source device 72 illustrated in FIG. 4 may be used. In this case, the white light emitted from the light source device has a very small variation in the white balance, and thus inexpensive light source device and projection display apparatus can be configured.

As the image forming element, the transmissive liquid-crystal panel is used, but a reflective liquid-crystal panel may be used in the configuration. The use of the reflective liquid-crystal panel makes it possible to configure a smaller, higher-definition projection display apparatus.

Fourth Exemplary Embodiment

Figure 7:
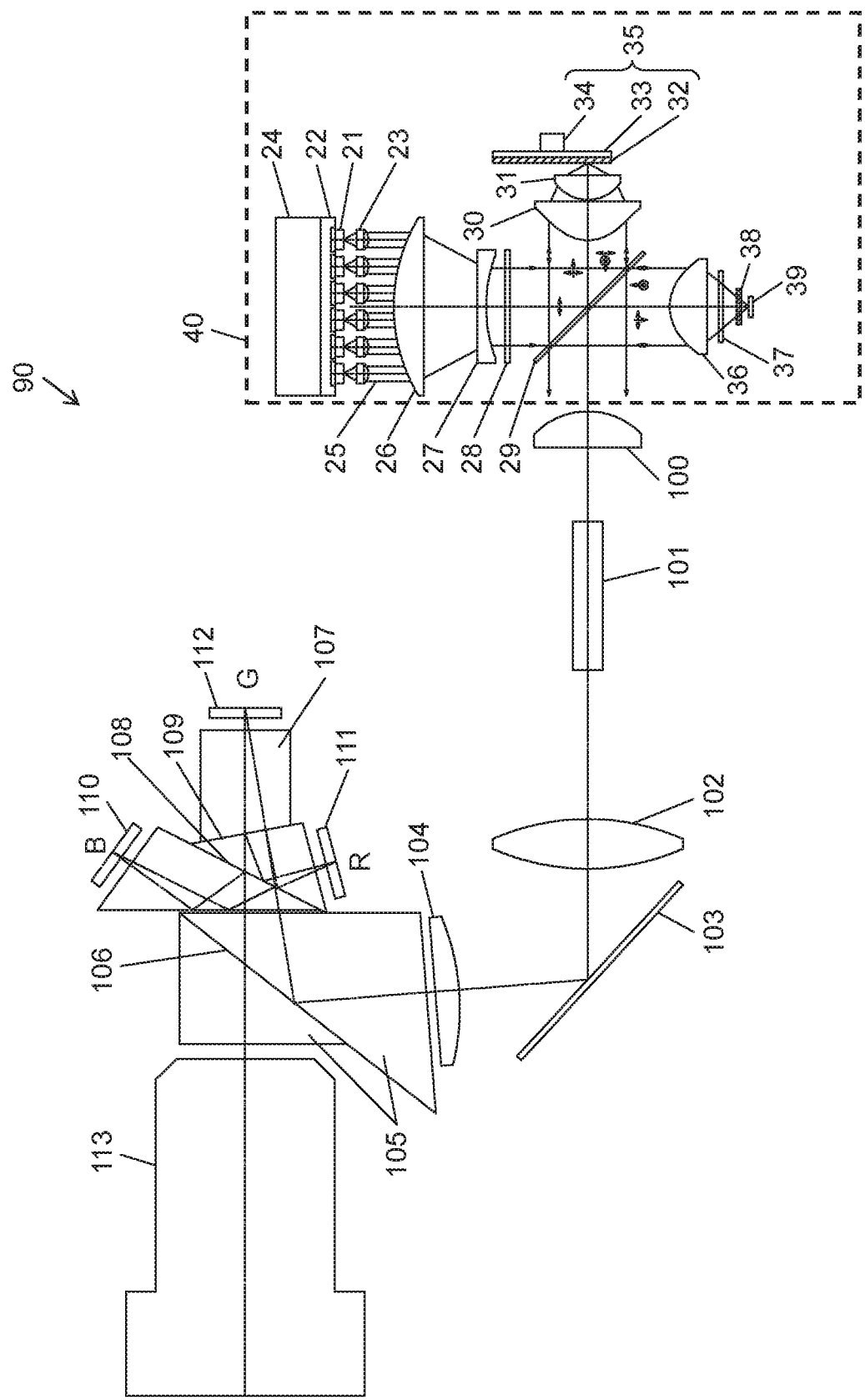
FIG. 7 is a configuration diagram of a projection display apparatus according to the fourth exemplary embodiment of the present disclosure.

FIG. 7 illustrates a second projection display apparatus according to the fourth exemplary embodiment of the present disclosure. Second projection display apparatus 90 uses three digital micromirror devices (DMDs) as the image forming device.

Light source device 40 includes: blue semiconductor laser 21; heat-dissipating plate 22; light-collecting lens 23; heat sink 24; lenses 26 and 27; first diffusion plate 28; dichroic mirror 29; condenser lenses 30 and 31; phosphor plate 35 including motor 34 and aluminum substrate 33 having a reflection film and phosphor layer 32; condenser lens 36; second diffusion plate 37; quarter-wave plate 38; and reflection plate 39. This light source device is light source device 40 according to the first exemplary embodiment of the present disclosure.

The white light emitted from light source device 40 enters condenser lens 100 and then is collected on rod 101. The light incident on rod 101 is reflected inside the rod more than one time and thus emitted having equalized light intensity distribution. The light emitted from rod 101 is collected by relay lens 102 and reflected off reflection mirror 103, thereafter entering total reflection prism 105 through field lens 104. Here, condenser lens 100, rod 101, relay lens 102, reflection mirror 103, and field lens 104 are one example of the illumination optical system.

Total reflection prism 105 is made up of two prisms and includes thin air layer 106 between proximate surfaces of these prisms. Air layer 106 totally reflects light incident at an angle greater than or equal to the critical angle. The light from field lens 104 is reflected off a total reflection surface of total reflection prism 105 and enters color prism 107.

Color prism 107 is made up of three prisms and includes blue reflection dichroic mirror 108 and red reflection dichroic mirror 109 between proximate surfaces of these prisms. Blue reflection dichroic mirror 108 and red reflection dichroic mirror 109 of color prism 107 separate the light into blue light, red light, and green light which then enter DMD 110, DMD 111, and DMD 112, respectively. DMDs 110, 111, and 112 deflect micro mirrors according to a video signal to reflect the light so that some of the light enters projection lens 113 and some of the light travels outward of the effective diameter of projection lens 113. The light reflected off DMDs 110, 111, and 112 passes through color prism 107 again. The blue light, red light, and green light resulting from the separation are combined in the process of passing through color prism 107 and then enter total reflection prism 105.

The light incident on total reflection prism 105 enters air layer 106 at are angle smaller than or equal to the critical angle and therefore enters projection lens 113 therethrough. In this way, the image light formed by DMDs 110, 111, and 112 is magnified and projected on a screen (not illustrated in the drawings).

The light source device includes the plurality of solid-state light sources and emits highly efficient white light having a good white balance, and thus it is possible to provide a projection display apparatus having a long operating life with high luminance. Furthermore, since the image forming element uses the DMDs, it is possible to configure a projection display apparatus e having high light resistance and heat resistance as compared to the case where the image forming element uses liquid crystals. Moreover, since the three DMDs are used, it is possible to obtain a bright, high definition projection image with good color reproducibility.

As described above, the second projection display apparatus in the present disclosure uses the light source device including the solid-state light source, which is a semiconductor laser, and the dichroic mirror that can separate p-polarized light originating from semiconductor laser light at a constant ratio of intensity and combine the yellow light containing green and red components radiated by being excited by one of the rays resulting from the separation and the blue light obtained by efficient polarization conversion of the other of the rays resulting from the separation by the small quarter-wave plate, to obtain white light. Thus, a small, inexpensive projection display apparatus can be configured. Although light source device 40 illustrated in FIG. 1 is used as the light source device, light source device 72 illustrated in FIG. 4 may be used. In this case, the white light emitted from the light source device has a very small variation in the white balance, and thus inexpensive light source device and projection display apparatus can be configured.

The first to fourth exemplary embodiments have each been described above by way of example of techniques disclosed in the present application. The techniques according to the present disclosure, however, are not limited to the foregoing exemplary embodiments, and can also be applied to exemplary embodiments obtained by carrying out modification, substitution, addition, omission, etc.

INDUSTRIAL APPLICABILITY

The present disclosure can be applied to a light source device for a projection display apparatus that uses an image forming element.

What is claimed is:

1. A light source device comprising:
   a solid-state light source;
   a first retardation plate that changes a polarization direction of light from the solid-state light source to make a ratio of p-polarization and s-polarization components of the light constant under control, the first retardation plate having a normalized transmittance of polarized light greater than 0.9 for incidence angles between negative 30 degrees to positive 30 degrees;
   a dichroic mirror that separates the light from the first retardation plate according to the polarization direction;
   a condenser element that collects light transmitted through the dichroic mirror;
   a second retardation plate that converts linearly polarized light into circularly polarized light, the second retardation plate having a normalized transmittance of polarized light greater than 0.9 for incidence angles between negative 30 degrees to positive 30 degrees; and a reflection plate, wherein
the first retardation plate is disposed at a point of incidence of one of collected light and divergent light between the solid-state light source and the dichroic mirror, the collected light being collected at a single light collection spot, the divergent light diverging from a single light collection spot, and
the second retardation plate is between the condenser element and the reflection plate.

2. The light source device according to claim 1, wherein each of the first and the second retardation plates is a thin-film retardation plate that uses birefringence due to oblique vapor deposition and includes an inorganic material.

3. The light source device according to claim 1, wherein each of the first and the second retardation plates is a microstructural retardation plate that uses birefringence due to a microstructure.

4. A projection display apparatus comprising:
a light source;
an illumination optical system that collects light from the light source and illuminates a to-be-illuminated region with the light;
an image forming element that forms an image according to a video signal; and
a projection lens that magnifies and projects the image formed by the image forming element, wherein
the light source is the light source device according to claim 1.

5. The light source device according to claim 1, further comprising a collimating lens between the first retardation plate and the dichroic mirror, the collimating lens being configured to collimate light from the solid-state light source.

6. The light source device according to claim 5, further comprising a first diffusion plate between the collimating lens and the dichroic mirror, the first diffusion plate being configured to diffuse the light collimated by the collimating lens.

7. The light source device according to claim 6, wherein a width of the first retardation plate is less than a width of the first diffusion plate.

8. The light source device according to claim 1, further comprising a second diffusion plate between the condenser element and the second retardation plate, the second diffusion plate being configured to diffuse the light collected by the condenser element.

9. The light source device according to claim 8, wherein a width of the second retardation plate is less than a width of the second diffusion plate.

10. The light source device according to claim 1, further comprising a mirror configured to reflect light from the solid-state light source toward the first retardation plate.

11. The light source device according to claim 10, wherein the mirror is configured such that the reflected light focuses between the mirror and the first retardation plate.

* * * * *